United States Patent
Vix

(10) Patent No.: US 6,222,713 B1
(45) Date of Patent: Apr. 24, 2001

(54) ELECTRICAL PROTECTIVE EQUIPMENT SWITCH WITH OVERCURRENT AND UNDERVOLTAGE FUNCTION AND OVERCURRENT SENSOR FOR IT

(75) Inventor: Martin Vix, Schenkon (CH)

(73) Assignee: Schurter AG, Luzern (CH)

( * ) Notice: Subject to any disclaimer, the term of this patent is extended or adjusted under 35 U.S.C. 154(b) by 0 days.

(21) Appl. No.: 09/306,891

(22) Filed: May 7, 1999

(30) Foreign Application Priority Data

May 8, 1998 (CH) .................................................. 1041/98

(51) Int. Cl.[7] .................................................. H02H 3/00
(52) U.S. Cl. .............................. 361/93.1; 361/87; 361/92; 361/93.6; 361/187
(58) Field of Search .................. 361/93.1, 93.6, 361/92, 170, 187, 87

(56) References Cited

U.S. PATENT DOCUMENTS

| | | | |
|---|---|---|---|
| 4,013,926 | * 3/1977 | Lang et al. | 361/115 |
| 4,016,518 | 4/1977 | Lang et al. | 335/7 |
| 4,025,823 | * 5/1977 | Lang et al. | 361/111 |
| 4,706,158 | 11/1987 | Todaro et al. | 361/92 |
| 4,833,563 | 5/1989 | Russell | 361/92 |
| 4,890,184 | * 12/1989 | Russell | 361/87 |
| 5,450,048 | 9/1995 | Leger et al. | 335/132 |

FOREIGN PATENT DOCUMENTS 1 212419   11/1970   (GB).

* cited by examiner

*Primary Examiner*—Michael J. Sherry
(74) *Attorney, Agent, or Firm*—Morgan, Lewis & Bockius LLP

(57) ABSTRACT

The protective equipment switch comprises a mechanical switching contact (2) for a conductor (S1–S3), a latchable switch latch (6) for the switching contact (2), an overcurrent sensor (3) associated with the conductor, and an electromechanical undervoltage relay (7) whose exciting voltage is derived from the conductor voltage and which in its excited state latches the switch latch (6). In the case of overcurrent, the overcurrent sensor (3) causes the separation of the undervoltage relay (7) from its exciting voltage which also drops in the case of undervoltage. Thus both in the case of overcurrent and in the case of undervoltage, unlatching of the switch latch (6) is caused by the same component, namely by the undervoltage relay (7). Preferably the overcurrent sensor (3) is formed by the combination of a current transformer signal with an electronic circuit which itself is preferably an integrated circuit. A particularly simple current transformer for acquiring the current flowing in the current conductor (S1–S3) results from a pair of inductive loops on both sides of a section of the conductor on a printed circuit board, with, for the purpose of forming an iron core for the current transformer, a pair of iron core halves (K11–K32) facing each other can be provided, one half on each side of the printed circuit board.

16 Claims, 4 Drawing Sheets

ELECTRICAL PROTECTIVE EQUIPMENT SWITCH WITH OVERCURRENT AND UNDERVOLTAGE FUNCTION AND OVERCURRENT SENSOR FOR IT

TECHNICAL FIELD

The present invention relates to a protective switch with overcurrent and undervoltage functions for devices connectable to the usual AC mains with e.g. 230V/400V mains voltage, with the protective switch comprising a mechanical switching contact for a conductor, a latchable switch latch for the switching contact, an overcurrent sensor associated with the conductor and an electromechanical undervoltage relay whose exciting voltage is derived from the conductor voltage.

The protective switch can be of one-pole construction but it is preferably of multi-pole construction, in particular 3-pole construction. In this case, depending on the number of poles, several individual conductors to be monitored for overcurrent as well as a switching contact for each conductor are present. By contrast, a single common switch latch is sufficient in this case too, for operating all existing switching contacts.

The invention also relates to a overcurrent sensor as it is preferably and advantageously used in connection with a protective equipment switch of the type mentioned above.

STATE OF THE ART

Protective equipment switches of the type mentioned above are known in various designs. Traditionally a bimetal is used as an overcurrent sensor and the undervoltage relay is often integrated into the undervoltage relay in a separate unit.

With regard to the generic protective equipment switches there is the constant requirement of making them more economical, with a determining factor, apart from simple construction made of the smallest number of components possible, increasingly being the ability of fully automatic production or assembly if at all possible, and with the requirement for efficient calibration.

SUMMARY OF THE INVENTION

The protective equipment switch according to the invention comprises a mechanical switching contact for a conductor, a latchable switch latch for the switching contact, an overcurrent sensor associated with the conductor, and an electromechanical undervoltage relay whose exciting voltage is derived from the conductor voltage, with the overcurrent sensor in the case of overcurrent causing separation of the undervoltage relay from its exciting voltage, and with the release of the undervoltage relay causing unlatching of the switch latch.

When compared with known designs, the protective equipment switch according to the invention inter alia is characterised in that both in the case of overcurrent and undercurrent, unlatching of the switch latch is caused by the same component, namely the undervoltage relay. In the case of undervoltage, the undervoltage relay loses its excitement in the usual way and releases; in the case of overcurrent, excitement of the undervoltage relay is actively interrupted by the overcurrent sensor.

Preferably the undervoltage relay is directly able to unlatch the switch latch in that its armature is directly configured as a latch or latch lever for the switch latch.

By using the undervoltage relay as an active element for unlatching the switch latch, instead of the usual bimetal, mechanically fixed elements can be used to advantage for constructing the overcurrent sensor, with the overcurrent sensor preferably being constructed by combining a current transformer with an electronic circuit.

Such an overcurrent sensor which also forms part of the present invention.

By means of the current transformer signal according to a specified characteristic (e.g. one which approaches that of a bimetal generally comprising a 1/x or a hyperbola characteristic of time against the current) the electronic circuitry causes the mentioned separation of the undervoltage relay from its exciting voltage. In this connection it is of further advantage if the electronic circuit is an integrated circuit in the form of a so-called application specific integrated circuit (ASIC).

A particularly simple current transformer results from a pair of inductive loops on both sides of a section of the conductor on a printed circuit board, with, for the purpose of forming an iron core for the current transformer, a pair of iron core halves facing each other can be provided, one half on each side of the printed circuit board. The printed circuit board can at the same time also be used as a carrier for the electronic circuit.

By using a transformer, the voltage supply for the electronic circuit can be from the conductor, with, at least if the electronic circuit is designed as an ASIC, additionally a rectifier being required. As is the case with the ASIC, the voltage transformer as well as the rectifier can be installed on the mentioned printed circuit board and like the ASIC, it can be completely or only partly integrated.

Preferably, in the electronic circuit, the exciting voltage for the undervoltage relay is also derived from the transformed voltage. The said undervoltage relay can then be controlled directly by the electronic circuit and in particular if the said electronic circuit is an ASIC, it can be designed in a very small and compact way due to the low voltage level (typically 5 V).

Further preferred embodiments and advantages of the invention are disclosed in the following description of an embodiment, with reference to the enclosed drawings.

BRIEF DESCRIPTION OF THE FIGURES

The following are shown.

DETAILED DESCRIPTION OF THE INVENTION

Figure 1:
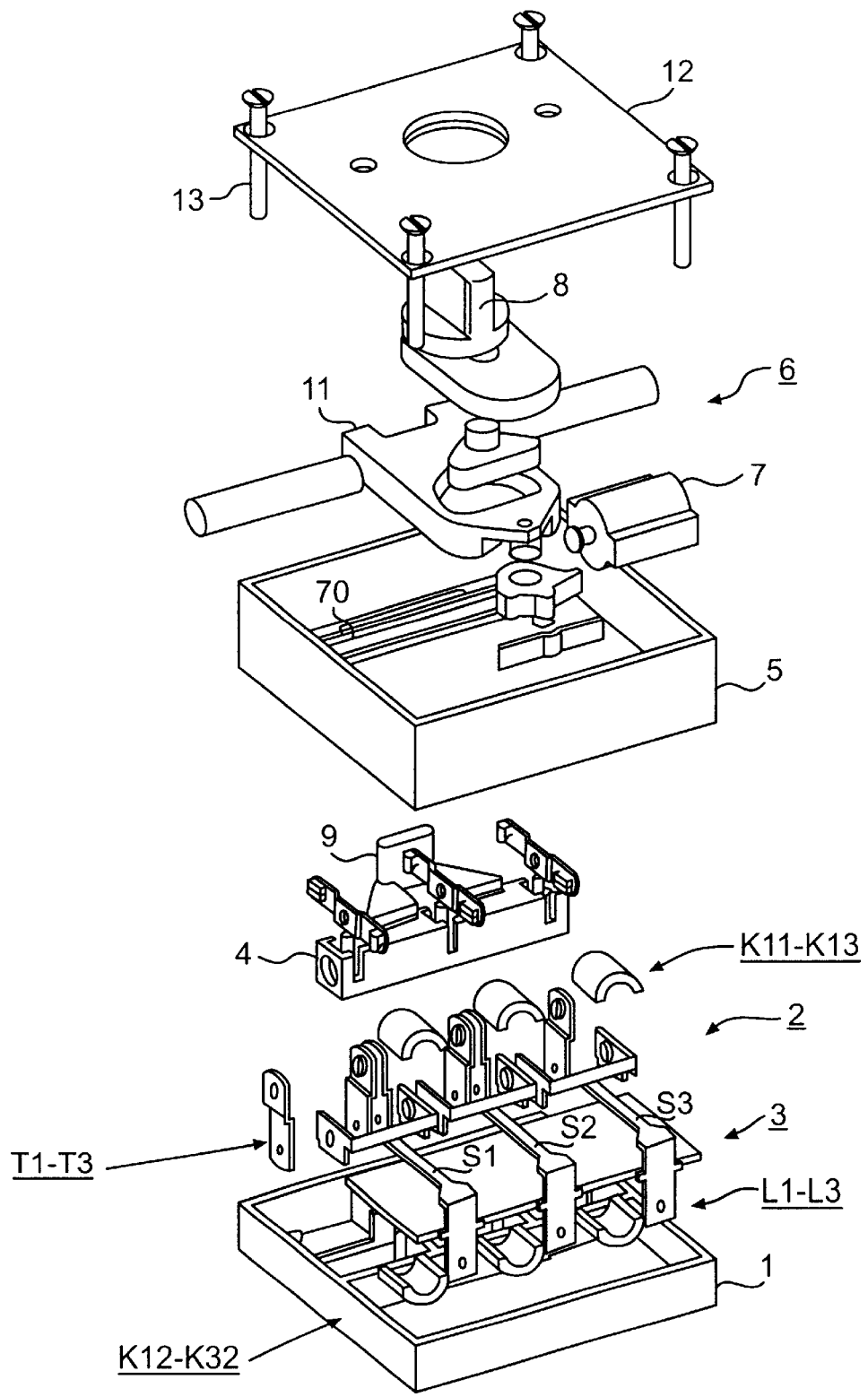
FIG. 1 an exploded view of a protective equipment switch with overcurrent and undervoltage function according to the invention.

FIG. 1 shows an exploded view of a three-pole electrical protective switch which is particularly suitable as a motor protection switch.

The protective switch is constructed in a modular way in several planes one on top of the other. FIG. 1 shows the bottom part of the housing shaped as a flat open-top dish.

This dish comprises three mechanical double-switch contacts 2 as well as a unit 3 comprising an overcurrent sensor which is used to acquire the currents flowing through the switching contacts 2 and between the switch terminals L1–L3 and T1–T3, to acquire the voltages present between these and to generate control voltages from these values. The lower part of the housing also accommodates a switch rod 4 which can be moved along its longitudinal direction, said switch rod 4 carrying parts of the switching contacts 2. By moving the switch rod 4, the switching contacts can be moved from a central Open or Zero position to two positions, one on each side of said switch rod 4, with the two On positions being able to be used e.g. for forward or reverse rotation of a connected electric motor.

In a further housing part 5 which is also shaped as an open-top dish, a switch latch 6 is arranged. An undervoltage relay 7 electrically coupled to the unit 3 is used to latch and unlatch the switch latch 6. The switch latch 6 is manually operable via a turning knob 8 and, by way of the switch rod 4, impinges on or moves the mechanical switching contacts 2 arranged in the lower housing part. For this purpose the switch rod 4 interacts with a switch lever 11 of the switch latch 6 by way of a cam 9. Through an aperture 10 in the bottom of the housing part 5, the cam 9 protrudes into the housing part 5. At the top, the protective switch is closed by a cover plate 12. By means of screws 13, the said cover plate 12 is connectable to the upper housing part 5 which in turn is connectable by screws to the lower housing part 1, thereby fixing all the parts of the protective switch. The protective switch can be installed completely from above, i.e. from one direction only.

Figure 2:
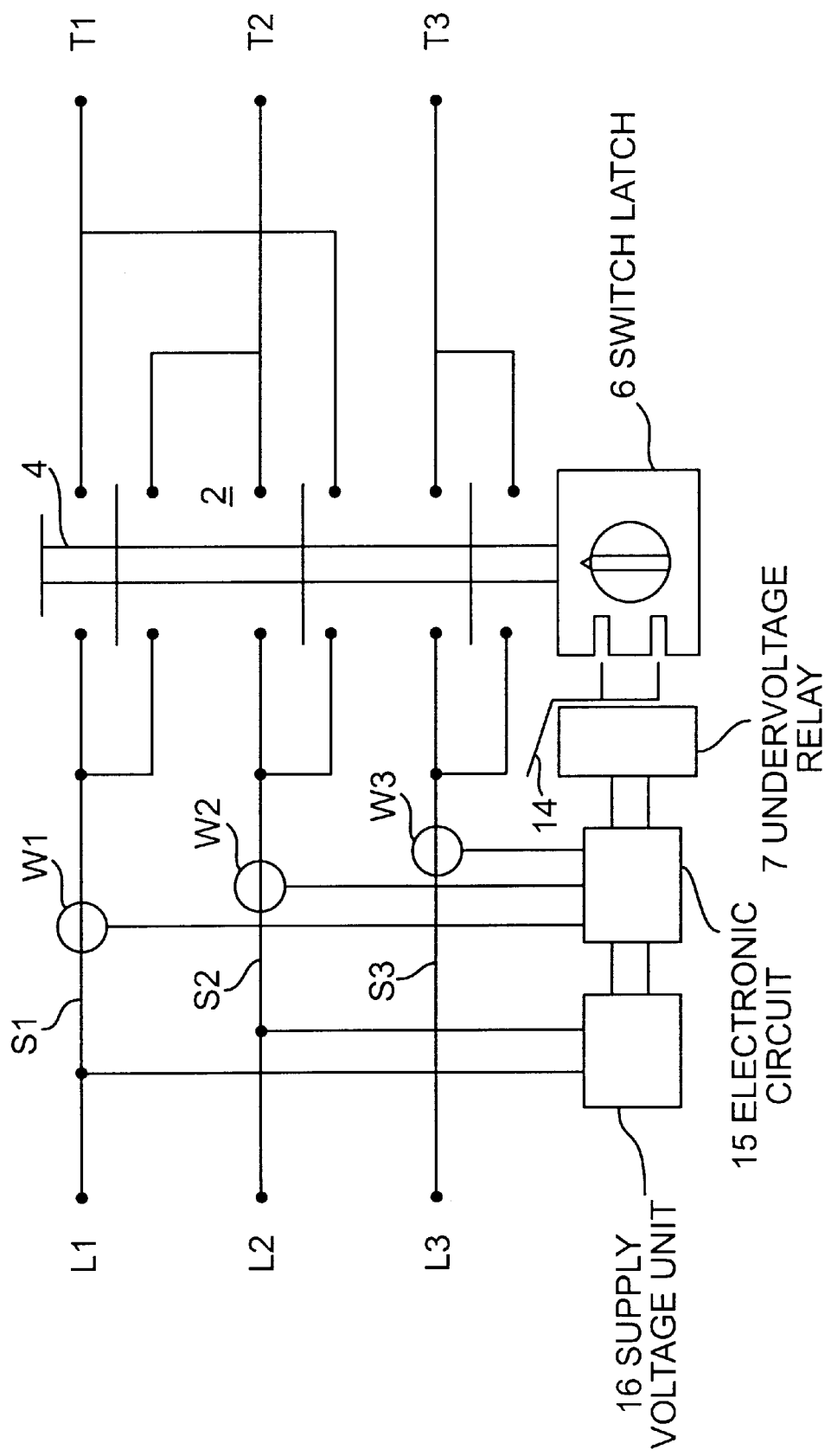
FIG. 2 a diagrammatic view of the basic design of a three-pole version of the switch.

FIG. 2 shows the principal construction of the protective switch of FIG. 1. The way is shown in which, by means of the switching contacts 2, the input terminals L1–L3 of the protective switch can be connected from the shown Zero or Open position with the output terminals T1–T3 in two ways by moving the switch rod 4. Movement of the switch rod 4 is effected by manually activating the switch latch 6. Switching on is however only possible if, and as long as, the armature 14 of the undervoltage relay 7 is in the pulled-in state and in connection with the switch latch 6 thus latching said latch, which is shown symbolically only. With the armature 14 releasing and the switch latch 6 unlatching in one of the switch On positions, the switch latch 6 causes a return movement of the switch rod 4 by spring action towards its Zero position, thus causing the switch contacts 2 to open.

Figure 3:
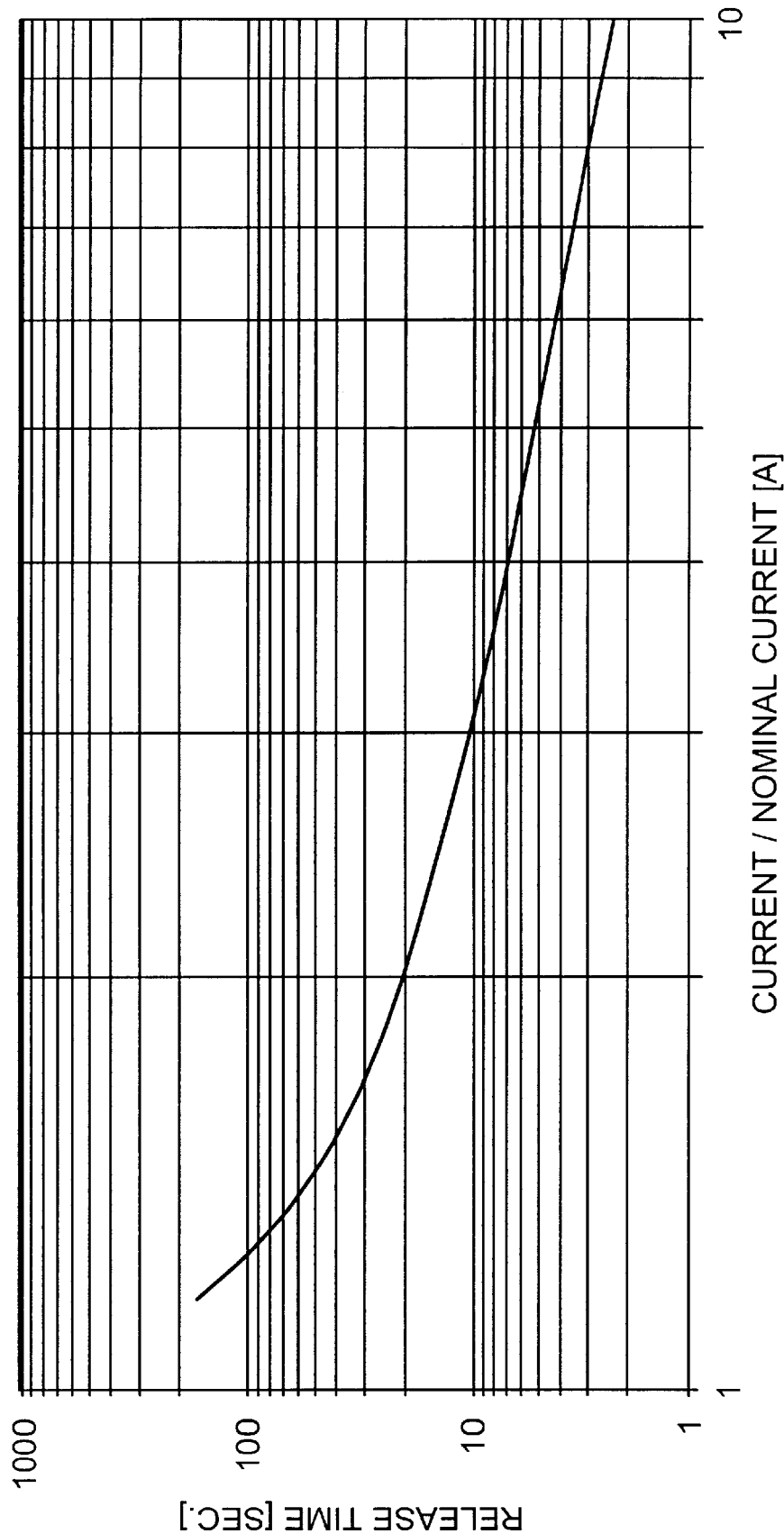
FIG. 3 a possible release curve.

The undervoltage relay 7 is selected in the sense of rotation of excitement of its coils by an electronic circuit 15, which here is embodied as an integrated circuit (ASIC) forming part of the unit 3. The currents I1–I3 in the three conductors S1–S3 are individually evaluated by the electronic circuit and the exciting voltage is generated or interrupted according to the release curve shown in FIG. 3 (release time against current or nominal current), with an interruption leading to release of the armature 14 and to unlatching of the switch latch 6. The release curve of FIG. 3 has a 1/x characteristic which in principle corresponds approximately to the release characteristic of traditional bimetal elements. The currents I1–I3 are acquired in the conductors S1–S3 by means of current transformers W1–W3. Together with the electronic circuit, the conductors W1–W3 form an overcurrent sensor.

The supply voltage for the electronic circuit 15 is supplied by a unit 16 connected to two of the conductors, in this case S1 and S2, comprising a voltage transformer and a rectifier circuit (not shown in detail). For example, from the voltage between the conductors which is e.g. 400 V, the unit 16 generates a direct voltage of 5 V. If the voltage between the two conductors S1 and S2 (mains voltage) is absent, the unit 16 can no longer supply a supply voltage to the electronic circuit 15 which can no longer generate any exciting voltage for the undervoltage relay. The absence of mains voltage thus leads to the release of the armature 14 of the undervoltage relay 7 and to unlatching the switch latch. Without supply voltage being present the switch cannot be switched on or switched on again.

Figure 4:
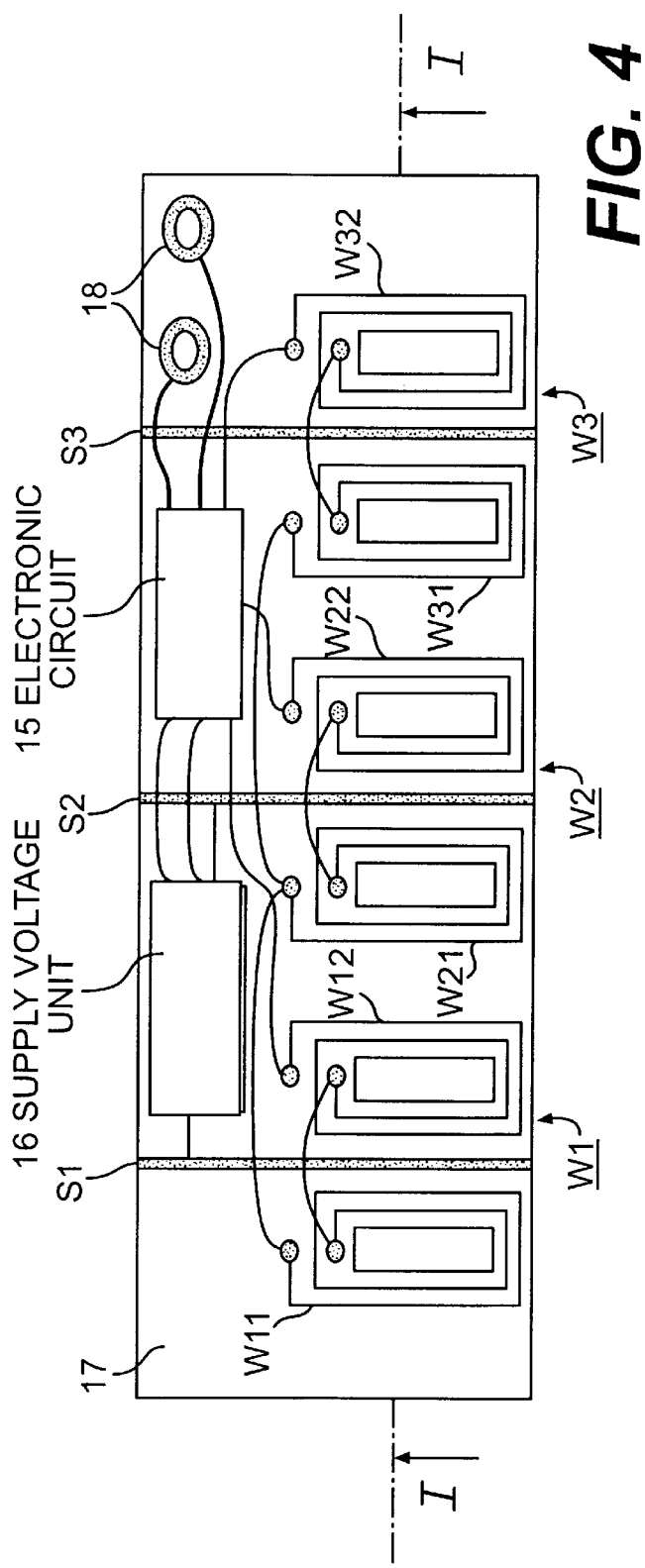
FIG. 4 an aspect of a printed circuit board with three current transformers, an ASIC for calculating the release curve as well as an integrated voltage transformer/rectifier to supply voltage to the ASIC.

FIG. 4 shows an aspect of a printed circuit board 17 used as a carrier for the electronic circuit (ASIC) 15 as well as the unit 16. On the printed circuit board 17 further sections of the three conductors S1–S3 are configured as straight sections of conducting tracks. A pair of spiral-shaped coils or inductive loops W11–W32 is arranged, also as flat conducting tracks, with half the pair on each side of these straight conducting tracks. Said coils or loops acquire the currents flowing in the conductors S1–S3.

Figure 5:
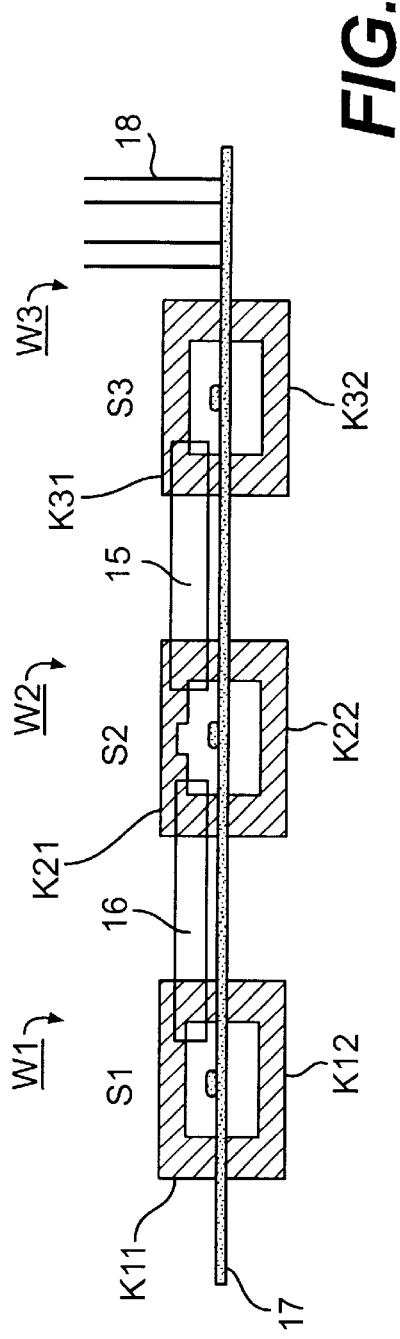
FIG. 5 a section (I—I) of the printed circuit board of FIG. 4.

As is shown in FIG. 5 which provides a sectional view of the printed circuit board 17 of FIG. 4, u-shaped halves K11–K32 constitute part of the current transformer W1–W3, with said halves being arranged on both sides of the printed circuit board 17, forming quasi-closed iron cores. In the plane of the printed circuit board 17, the facing u-limbs of the iron core halves (K11–K32) are enclosed by the spiral-shaped coils of the current transformers W1–W3. In FIG. 1 the iron core halves K11–K32 can also be recognised, except that there they are drawn in semicircular shape.

FIGS. 4 and 5 also show the connection pins 18 which point upwards from the printed circuit board 17. They establish a direct connection between the electronic circuit (ASIC) 15 and the undervoltage relay 7 arranged in the upper housing part 5.

As far as the electronic circuit (ASIC) 15 and the unit 16 to generate the supply voltage are concerned, as already mentioned, they are preferably designed to be as compact as possible, in particular designed as integrated components, thus achieving the highest possible miniaturisation of the entire switch construction. Advantageously, the protective function carried out by the electronic switch 15 can be realised by digital numeric calculation of the release curve shown in FIG. 3. In this case, the switch can be calibrated very simply by suitable programming of the electronic circuit (e.g. changing a stored calculation parameter).

What is claimed is:

1. An electrical protective equipment switch with overcurrent and undercurrent function, comprising:
   a mechanical switching contact for a conductor;
   a latchable switch latch for the switching contact;
   an overcurrent sensor associated with the conductor;
   an electromechanical undervoltage relay whose exciting voltage is derived from the conductor voltage; and
   wherein the case of overcurrent, the overcurrent sensor causes the separation of the undervoltage relay from its exciting voltage and the release of the undervoltage relay causes the unlatching of the switch latch.

2. The protective equipment switch according to claim 1, wherein an armature of the undervoltage relay is configured as a latch for the switch latch.

3. The protective equipment switch according to claim 1 or 2, wherein the overcurrent sensor comprises a current transformer as well as an electronic circuit which by means of a current transformer signal causes the separation of the undervoltage relay from its exciting voltage, according to a specified characteristic.

4. The protective equipment switch according to claim 3, wherein a supply voltage for the electronic circuit is conducted from the conductor voltage by means of a voltage transformer/rectifier circuit.

5. The protective equipment switch according to claim 3, wherein the exciting voltage for the undervoltage relay is generated in the electronic circuit.

6. The protective equipment switch according to claim 3, wherein the electronic circuit is an integrated circuit.

7. The protective equipment switch according to claim 3, wherein a current transformer is formed by a pair of inductive loops on both sides of a section of a conductor on a printed circuit board and an iron core for the current transformer is formed by a pair of iron core halves, facing each other, one half on each side of the printed circuit board.

8. The protective equipment switch according to claim 7, wherein the printed circuit board is used as a carrier for an integrated circuit.

9. The protective equipment switch according to claim 7, wherein the printed circuit board is used as a carrier for the voltage transformer/rectifier circuit.

10. The protective equipment switch according to claim 1 or 2, wherein the switch is integrated in a housing, with the switching contact and the current sensor being arranged in a first installation plane and the switch latch and the undervoltage relay being arranged in a second installation plane.

11. The protective equipment switch according to claim 1 or 2, wherein the switch latch can be operated manually via a turning lever.

12. The protective equipment switch according to claim 1 or 2, wherein the overcurrent sensor is constructed by combining a voltage transformer with an electronic circuit.

13. The protective equipment switch according to claim 12, wherein the electronic circuit causes a release of an armature in the undervoltage relay according to a specified characteristic by means of a current transformer signal.

14. The protective equipment switch according to claim 12, wherein the electronic circuit is constructed as an integrated circuit in the shape of an application-specific integrated circuit (ASIC).

15. The protective equipment switch according to claim 12, wherein the current transformer comprises a pair of inductive loops on both sides of a section of a conductor on a printed circuit board and an iron core for the current transformer is formed by a pair of iron core halves, facing each other, one half on each side of the printed circuit board.

16. The protective equipment switch according to claim 15, wherein the printed circuit board is used as a carrier for the electronic circuit.

* * * * *